United States Patent

Beken et al.

[11] 3,873,070
[45] Mar. 25, 1975

[54] CONTINUOUS MIXING MACHINES
[75] Inventors: Horace Fritz Beken; John Michael Beken, both of Barking, England
[73] Assignee: Beken Engineering Limited, Barking, Essex, England
[22] Filed: Sept. 10, 1973
[21] Appl. No.: 395,458

[30] Foreign Application Priority Data
Nov. 8, 1972 United Kingdom............... 51548/72

[52] U.S. Cl..................................... 259/6, 259/192
[51] Int. Cl. ......... B01f 7/04, B01f 7/08, B29b 1/10
[58] Field of Search ......... 259/9, 10, 104, 185, 191, 259/192, 193, 6, DIG. 13

[56] References Cited
UNITED STATES PATENTS

| | | | |
|---|---|---|---|
| 2,570,864 | 10/1951 | Rowlson | 259/104 |
| 3,239,878 | 3/1966 | Ahlefeld, Jr. | 259/192 |
| 3,349,432 | 10/1967 | Breneman | 259/192 |
| 3,638,921 | 2/1972 | Bredeson | 259/9 X |
| 3,704,866 | 12/1972 | Mosher | 259/192 |
| 3,719,350 | 3/1973 | Loomans | 259/185 X |

Primary Examiner—Harvey C. Hornsby
Assistant Examiner—Alan Cantor
Attorney, Agent, or Firm—Young & Thompson

[57] ABSTRACT

The invention provides an improved continuous mixing machine of the type comprising a mixing chamber having inlet means for material to be mixed therein and outlet means for materials mixed therein and in which chamber is accommodated a pair of axially parallel rotatable shafts. The improvement comprises the employing of shafts which have intermeshing circumferentially extending feed worm sections at their inlet ends and a plurality of intermeshing mixing blades on the outlet side of the feed worm sections. Drive means are provided for rotating these shafts in opposite senses and at different speeds whereby the feed worm sections advance material from the inlet means towards the outlet means but the intermeshing mixing blades mix the materials without substantially advancing them towards the outlet means. The rate of flow of material through the mixing chamber is controlled by feeding means supplying materials to be mixed at a predetermined rate which preferably can be varied as desired.

10 Claims, 5 Drawing Figures

CONTINUOUS MIXING MACHINES

This invention relates to continuous mixing machines, and more especially to machines of the kind disclosed in British Patent No. 769,106 wherein materials to be mixed are continuously fed through a port at one end and on the top of a mixing chamber in which it is acted upon by intermeshing mixing blades and discharge through a port underneath and at the other end of the chamber at about 90° to the axis of the blades. Material is propelled through the mixing chamber by screw-like blades in one direction only.

There are many formulations fo materials which need to be mixed. Each formulation requires a different amount of mixing to attain the required dispersion. Therefore for a given throughput any given formulation should dwell in the mixing chamber, to be worked upon by the blades, for a specific length of time.

This dwell or mixing time, or period of time the material remains in the mixer, is determined by the rate at which it flows through the machine. In the previously known machine mentioned above the flow rate is controlled by the pitch or helix angle of the mixing blades. Thus in order to achieve the required mixing time for a particular material it is necessary to select blades with suitable pitches. Furthermore, because the characteristics e.g., coefficient of friction, flow properties etcetera, between materials differ considerably, this time has been determined on difficult trial and error basis. When the preferred pitch is eventually established, and the mixing blades fitted in the chamber, there is no allowance for adjustment for a slightly longer or shorter mixing time to give final accuracy of dispersion.

With a view to overcoming the limitations and disadvantages of the aforesaid known machine, the present invention consists in a continuous mixing machine comprising a mixing chamber through which materials to be mixed are passed, and, housed in said chamber, worm means for advancing the materials, and mixer blades, having little or no effect upon advance of the materials, for mixing the materials together.

The machine may incorporate means for feeding materials to be mixed into the mixing chamber at a prearranged, and variable, rate.

A machine in accordance with the invention offers more versatile facilities than the previously known machine for:

a. Accurately controlling the mixing times of the materials in the mixing chamber to give the required degree of dispersion of a wide range of different materials without having to change the feed or mixing elements.

b. Easily adjusting and controlling the throughput of the materials from virtually zero to the maximum capacity of the machine whilst still maintaining the predetermined amount of work (mixing) on the material. This is done by simultaneously varying the speed of the feeder/s pump/s and the mixing machine in direction proportion to each other: and, c. More accurate mixing by better inter-dispersion of the materials along the length of the mixing chamber.

The invention will be clearly understood from the following description of forms (given, however, merely by way of example) which it may assume, and this description will be more readily followed by reference to the accompanying drawings wherein FIG. 1 represents a side sectional elevation of a mixing machine in accordance with the invention:

Figure 1:
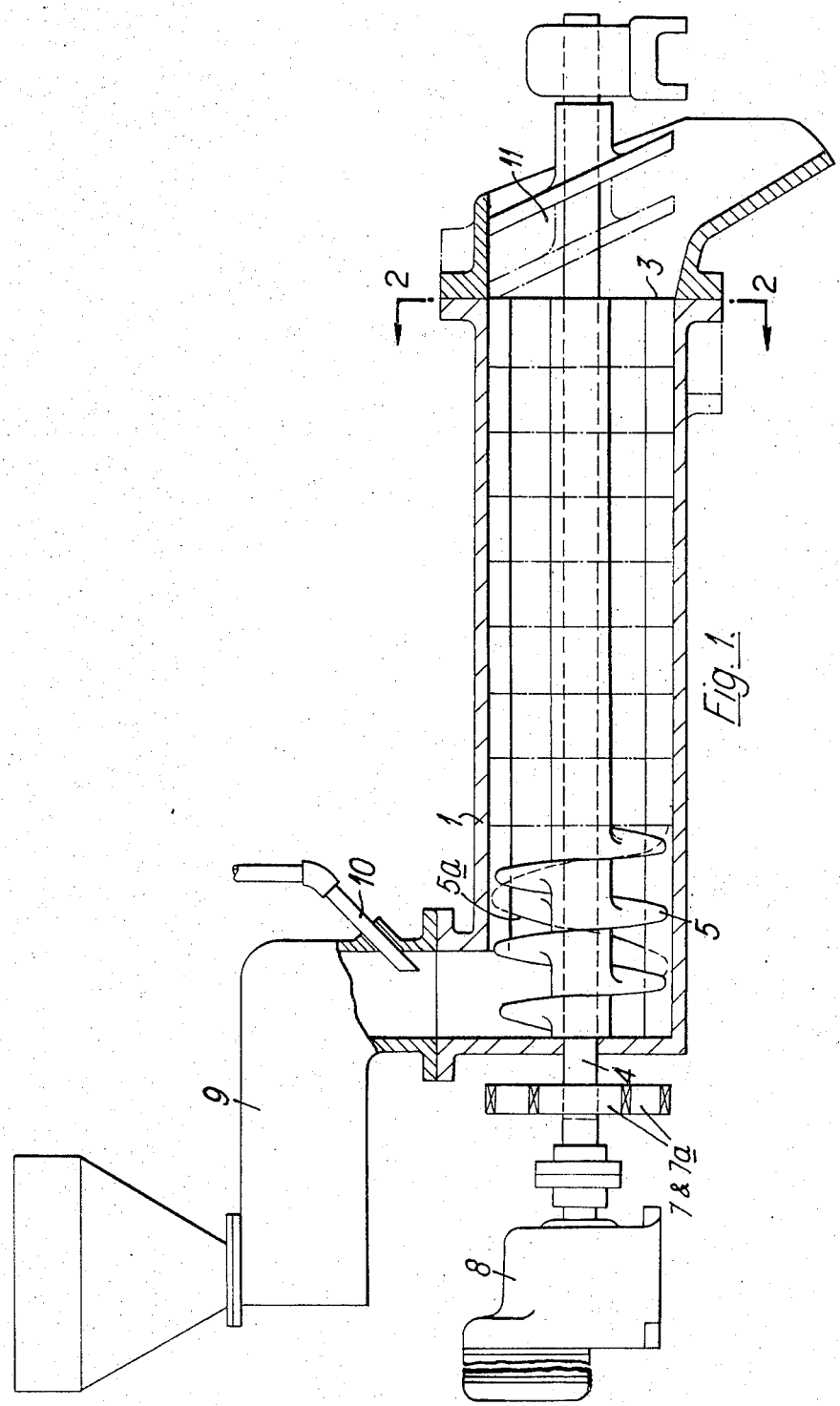
Figure 2:
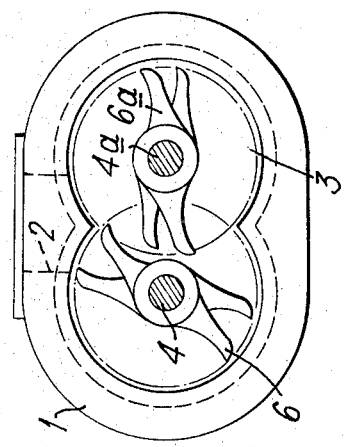
FIG. 2 represents a transverse section in the plane 2—2 of FIG. 1.
Figure 3:
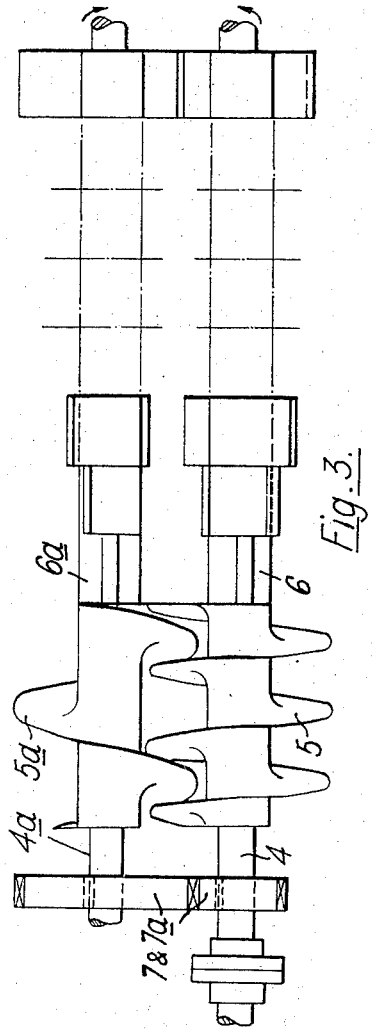
FIG. 3 represents a plan view of the shafts and the feed and mixer elements thereon, shown in FIG. 1.

In carrying the invention into effect in one convenient manner, as shown in FIGS. 1–3 of the aforesaid drawings, a mixing machine comprises a double chambered body 1 of figure-of-eight cross-section, having an inlet port 2, on the top at the in-feed end, and an outlet opening 3, at the discharge end or other convenient position.

Two parallel shafts 4 and 4a are positioned one in each of the two chambers. On the shafts, at the feed end are mounted a pair of intermeshing feed worms 5 and 5a, and along the remaining length of the chambers, a number of pairs of mixing rotors 6 and 6a.

The two shafts and their respective worms and mixing rotors are arranged to revolve at different speeds by means of timing gears 7 and 7a. A suitable drive such as a geared motor unit 8 may drive either the faster speed shaft, as shown, or the slow speed shaft.

The pitch angles of the feed worms 5 and 5a, are so arranged as to enable them to feed volumes of most kinds of materials, ranging from the smallest amount required to give the longest necessary mixing time in the mixer to a much greater amount to provide for the shortest required mixing time.

The feed worms which intermesh have different pitches, of opposite hand; they run at different speeds determined by the gears 7, 7a and are automatically self clearing.

The mixing rotors 6 and 6a consist each of a boss bored and keywayed to suit the shaft and having two diametrically opposed blades projecting radially from the boss as shown.

These rotors work in pairs, one on each shaft.

The blades may be positioned lengthwise along the boss and parallel with its axis as shown in FIG. 2. Any pairs of rotors may have their blades set around the shaft angularly displaced in relation to other pairs, in order to stagger the compression operations and so relieve the peak load at any one time on the drive motor.

The rotors being separate units staggered around the shafts in relation to neighbouring rotors, allow material to be spewed axially in both directions during each compression operation so that, those portions which are spewed both forward and backward are incorporated with that material which is compressed and mixed by the two adjacent pairs of rotors and so on down the length of the chamber. This is indicated by arrow B - B in FIG. 4 but also applies when using parallel blades.

This overlapping of material from one section in the length of the chamber to another smoothes out decrepancies and performs a mixing operation more likened to that provided in a batch mixer wherein all portions of the batch are intermixed. It will be noted that the rotor 6 rotates twice as fast as rotor 6a so that the blades on the former gain on the blades of the latter and this effects a compression or squeezing action on the material.

Figure 4:
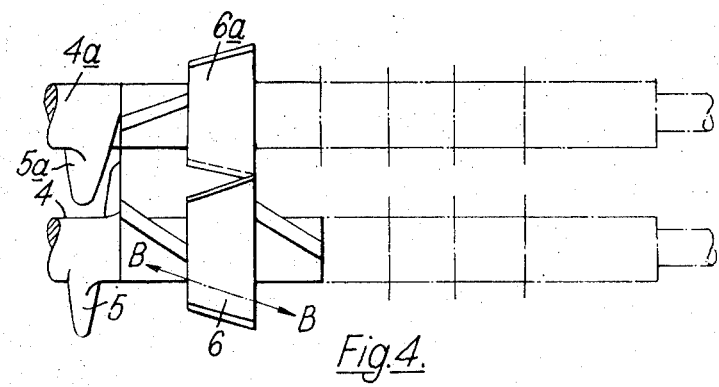
FIGS. 4 and 5 represent modified arrangements of mixer elements which may be incorporated in a machine in accordance with the invention.
Figure 5:
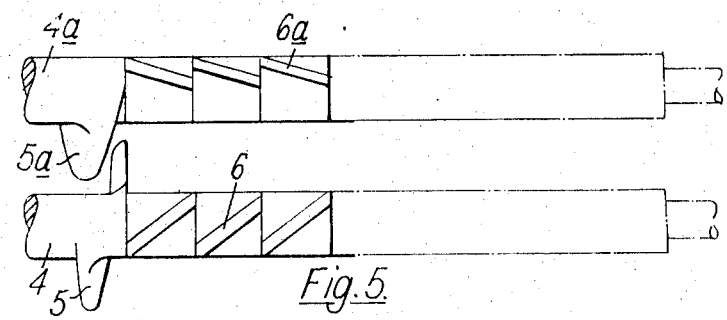

It will be seen that, apart from applied friction, the mixing rotors have little or no influence on the material flow rate through the machine. Therefore it is now possible according to this invention to:

a. Feed the materials to be mixed by means of any suitable variable feeder/s 9 and liquids, if required, by suitable variable delivery pump/s via feed pipe 10, into the mixer feed worms 5 and 5a which in turn force them through the mixing rotors. The feeder/s and pump/s can be set to adjust the material flow rate to give the required mixing time for correct dispersion.

b Vary the throughput, to line up with other machines in a continuous process system, whilst maintaining the given amount of mixing by varying the feed rate of the feeder/s and pump/s, and the speed of the mixer in direct proportion to each other.

c Gain advantages by setting rotor blades with their faces at an angle to the boss as shown in FIGS. 4 and 5 in which case:

1. One mixing rotor of a pair may have the blades with either a right or left hand pitch and, whichever this is, the blades of the opposing rotor of the opposite hand.

2. In each pair, the pitch angle of the blades of one rotor is greater than that of its opposing rotor to effect a cleaning action by the edge of the blade of one rotor over a greater blade face area of its opponent.

3. The rotors may be arranged on their respective shafts with the helix angles all one hand as shown in FIG. 4. This arrangement helps to relieve the pressure on the feed worms when mixing materials with bad flow properties, without effect on the rate of flow.

4. Materials of low mechanical strength can be compacted for more intensive mixing by using the arrangement in FIG. 5 without effecting the rate of flow once the chamber is full.

5. Alternatively a combination of the two arrangements may be used when dealing with such materials whose characteristics change as more work i.e. mixing, is applied to them.

If when using mixing rotors described herein, certain materials still tend to gravitate through the machine too quickly this could be overcome by incorporating a discharge control unit 11 such as is specified in the specification of copending Patent application No. 46897/71.

It should be understood that the invention is not limited solely to the details of the forms described above which may be modified in order to meet various conditions and requirements encountered without departing from the scope of the invention.

What we claim is:

1. A continuous mixing machine comprising a mixing chamber having inlet means for materials to be mixed therein and outlet means for materials mixed therein; feeder means for supplying materials to be mixed to said inlet means at a predetermined rate;
   a pair of axially parallel rotatable shafts accommodated in said mixing chamber between said inlet means and said outlet means;
   drive means for rotating said shafts in opposite senses and at different speeds;
   circumferentially extending feed worm sections at the inlet ends of said shafts, which sections intermesh whereby material is advanced from said inlet means towards said outlet means;
   mixing blade sections on said shafts on the outlet side of the feed worm sections, which mixing blade sections each comprises a plurality of axially spaced mixing blades and which intermesh whereby material is mixed but not substantially advanced.

2. A mixing machine as claimed in claim 1 wherein the mixer blades extend in pairs substantially radially from a common boss.

3. A mixing machine as claimed in claim 1 wherein the mixer blades located in successive positions along their shaft 4. A mixing machine as claimed in claim 1 wherein the mixing chamber comprises two intercommunicating part-cylindrical compartments giving the chamber a figure-of-eight cross section, of which each compartment houses a said shaft.

5. A mixing machine as claimed in claim 1 wherein the mixer blades on the respective shafts are formed and relatively orientated whereby, as the shafts rotate, materials being mixed are pressed together between cooperating blades of the two shafts.

6. A mixing machine as claim in claim 5 wherein the mixer blades are so orientated on their respective shafts, having regard to the different speeds at which the shafts are driven, that blades on opposite shafts cooperate to perform automatic clearance therefrom of materials being mixed.

7. A mixing machine as claimed in claim 1 wherein the feeder means comprises means for introducing liquid with other materials to be mixed.

8. A mixing machine as claimed in claim 1, comprising at the discharge end of the chamber means for controlling rate of discharge of the mixed materials.

9. A mixing machine as claimed in claim 1 wherein the rate at which the feeder means supplies materials to the inlet means can be varied as desired.

10. A mixing machine as claimed in claim 1 wherein the shafts are driven at a 2:1 ratio.

* * * * *